F. D. HOUGHTON.
SPRAYING DEVICE.
APPLICATION FILED JAN. 20, 1916.

1,225,713.

Patented May 8, 1917.
2 SHEETS—SHEET 1.

Inventor
F. D. Houghton.
By Attorneys
Southgate & Southgate

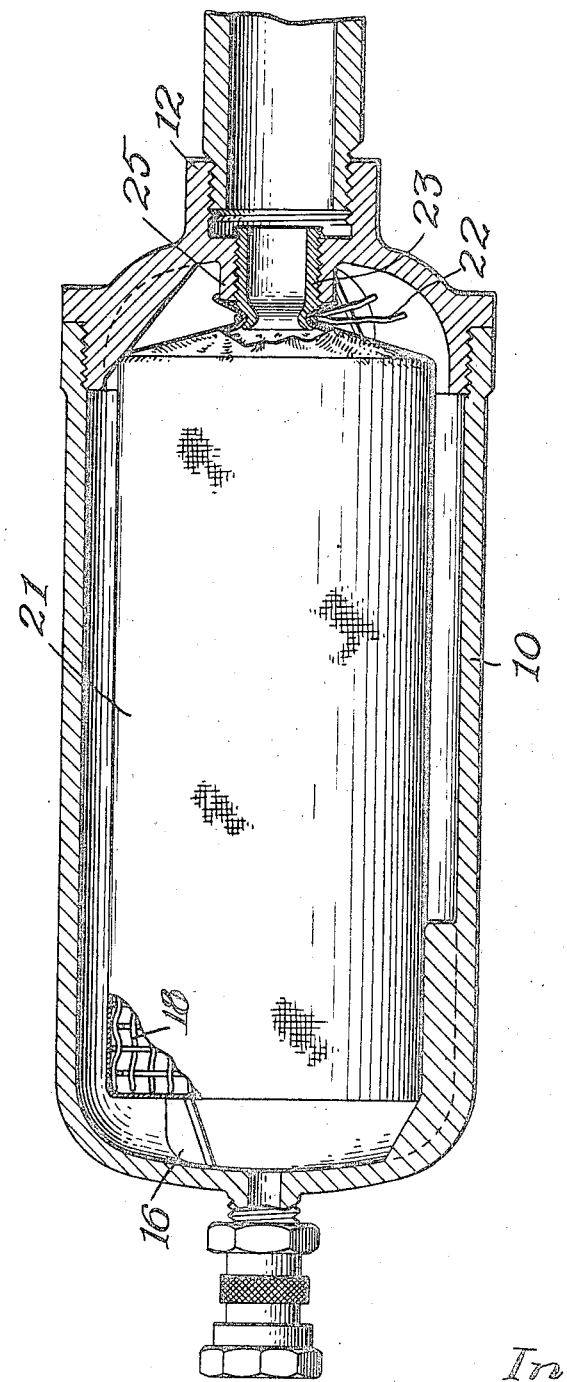

UNITED STATES PATENT OFFICE.

FREDERIC D. HOUGHTON, OF WORCESTER, MASSACHUSETTS.

SPRAYING DEVICE.

1,225,713.

Specification of Letters Patent.

Patented May 8, 1917.

Application filed January 20, 1916. Serial No. 73,241.

*To all whom it may concern:*

Be it known that I, FREDERIC D. HOUGHTON, a citizen of the United States, residing at Worcester, in the county of Worcester and State of Massachusetts, have invented a new and useful Spraying Device, of which the following is a specification.

This invention relates to a device for use in spraying vegetation and the like either for the purpose of treating scale, fungus growth, insects, and the like, or for fertilization or other purposes.

The principal object of the invention is to provide a simple and inexpensive means for effectively doing away with the clogging of the spraying nozzle. The invention also involves improvements in details of construction and arrangement of parts as will appear.

Reference is to be had to the accompanying drawings in which—

Fig. 3 is a sectional view of a modification.

The usual way of spraying vegetation is to provide a tank of solution and force the same therefrom by means of a pump. This has proven effective, but is not entirely satisfactory on account of the fact that if the material is not carefully filtered before it is placed in the tank the spray nozzle is likely to become clogged after some use. Another method which has been devised for spraying is to provide a solid cake of soluble material and force the water through or around the same for the purpose of dissolving the material and spraying the solution through the nozzle. This is also defective for the reason that the clogging is found to occur quicker and the ordinary means of straining do not prevent it. Ordinary metallic screens have been proposed for this purpose and it has been found that they clog up as well as the nozzle if they are especially fine. If they are made of coarse mesh they do not prevent the clogging of the nozzle. The reason for this clogging has not been fully understood, I believe. It has been thought that it was due, especially in the case of the use of a lime sulfur cake, to the corrosion of the surface of the nozzle and screen. By experimenting I have found that the difficulty is due mainly to the fact that when the sulfur composition is cast, globules of substantially pure sulfur crystals are interspersed throughout the cake and are usually much harder than the portions of the cake which are acted on by the lime and by an alkali, if that is used, and are practically insoluble in water. The result is that as the composition dissolves these globules are loosened and as they are of varying size they sooner or later clog the nozzle and if a metallic screen is used they get lodged in that and clog it also. This is largely due to the fact that the screen is stationary and the stream of water goes through it always in the same direction.

After a great deal of experimenting for the purpose of attempting to do away with the insoluble sulfur crystals or globules I have discovered that this difficulty can be overcome in a very simple manner, although the sulfur particles are allowed to remain in the composition.

Figure 1:
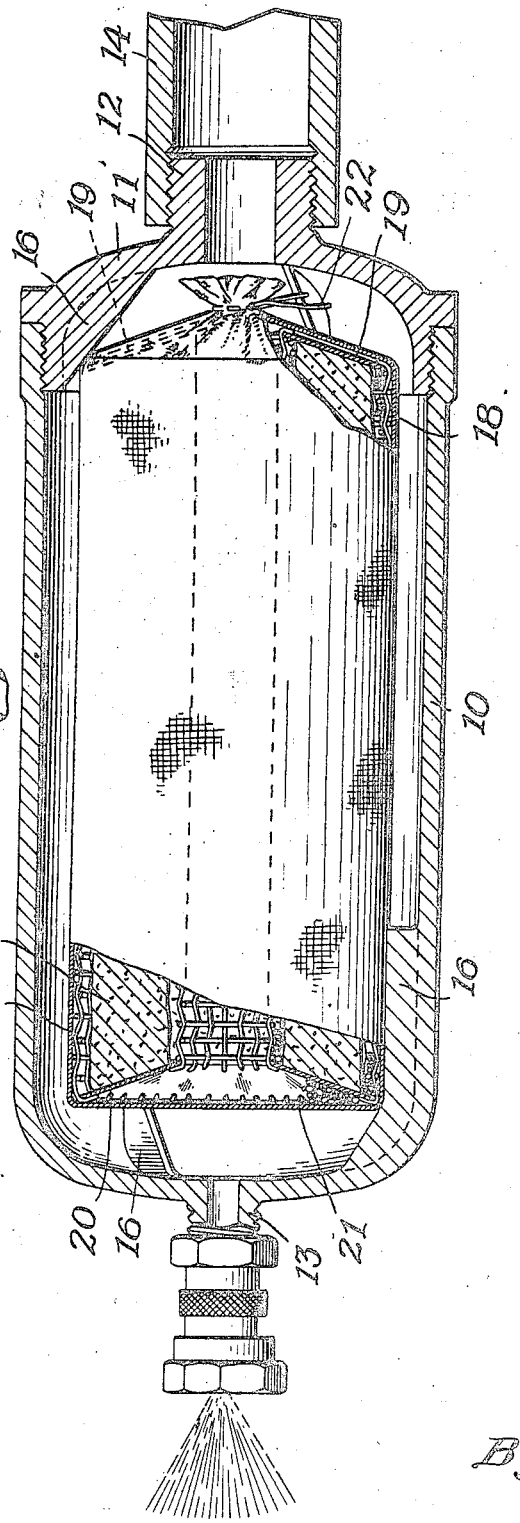
Figure 1 is a central longitudinal sectional view of a preferred embodiment of the invention.
Figure 2:
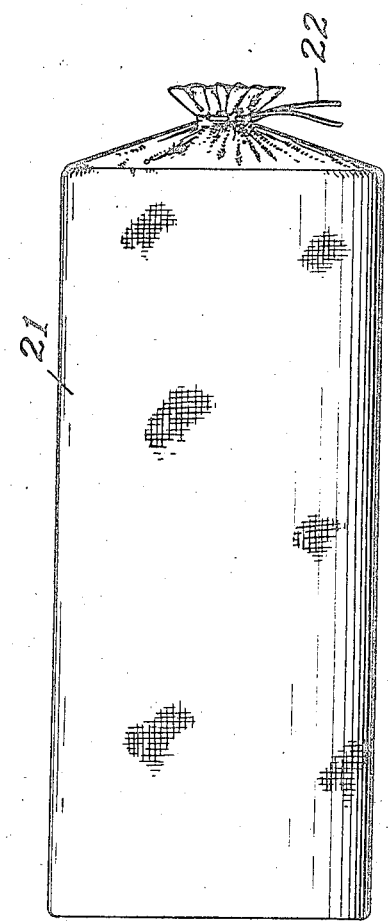
Fig. 2 is an elevation of the cartridge of soluble material removed from the casing and showing the filter bag thereon.

I will describe the way in which I accomplish this result with reference to Figs. 1 and 2. In this drawing is shown a casing 10 having a cover 11 which constitutes part of the casing. This cover is screwed into the end of the casing and is provided with an inlet 12 while the casing is shown as having an outlet 13. The inlet and outlet are located preferably at opposite ends of the substantially cylindrical casing or receptacle, the outlet being smaller than the inlet. The inlet is surrounded by a screw threaded hub on which the hose line 14 is connected and the outlet is provided with a similar hub on which the nozzle is applied. Any desired type of nozzle can be used with my invention, although heretofore many kinds were entirely unsuitable for this kind of spraying.

The casing with its cover is shown as provided with ribs 16 for centering the cake 17 of lime sulfur or any other soluble composition. In the present case this cake is shown as surrounded by a coarse wire screen 18, and as having a tin convex plate 19 at the inlet end and a tin concave plate 20 at the outlet end. These tin caps are connected with the wire screen 18 and the whole constitutes a comparatively rigid support for the cake of soluble material which is cast, and consequently abuts against the two tin plates. These parts are so arranged with reference to the passage of the stream of water through the receptacle that the water does not come in contact with the ends of the cake and consequently the cake remains of the same length substantially throughout the operation of dissolving it, so that the cake is always held rigidly in position by the wire screen and end plates.

This cake with its wire screen and end plates, before being placed in the receptacle, is inclosed in a screen bag 21 formed of woven textile fabric, as for example, cotton cloth of a fairly fine mesh. I have shown this bag as entirely inclosing the cake and having a string 22 at its end for tying it up. Thus the cake or cartridge can be sold in this bag and after a customer has the necessary casing or receptacle he will buy the cartridges each one inclosed in a bag which is intended to be used only once. However it will be obvious that it is not necessary to inclose the entire cartridge in the bag, but it is essential that the outlet end be inclosed and that the end of the bag be stretched over the concave end of the cake or cartridge at the outlet end. This provides a free space in which the globules can collect without clogging the screen. It is desirable not to have any special fullness of the bag at this point in order to prevent the bag being sucked into the outlet 13 and clogging it up. It is to be noted that this end of the cake as well as the other end, is spaced from the end of the casing or receptacle so as to give a little space in which the bag can stretch out when under pressure. Inasmuch as the end of the cake remains constantly in the same position in the receptacle during the entire dissolving action and the wire screen 18 holds the bag in the same position the action of the filtering bag will not be disturbed by the dissolution of the cake while it is being used.

In operation the water is introduced through the hose into the casing and forced out through the nozzle by the water pressure whether produced by a pump or taken from the water mains. The part of the water that never enters the bag is not necessarily filtered by this arrangement, but all the water that does enter the bag is filtered by it. It is found in practice that upon forcing the water through the apparatus in this way a large number of globules of substantially pure sulfur are caught in the end of the bag and in the hollow between the end of the bag and the cap 20. They are all held here and not distributed over the inner surface of the bag. By the provision of this space the collection of these globules at any point where they would interfere with the stream of water going through the apparatus is prevented. They are always collected on the surface of the plate 20 which, as has been explained, has as one function the protection of the end of the cake of soluble material. Consequently the accumulation of these particles in this space has no effect on the current of water and solution passing through.

I have found in practice that in some cases where a lime sulfur cartridge of suitable size is used, by the time it is dissolved a teaspoonful of sulfur particles will be collected. These particles vary all the way from a fine dust to globules as much as an eighth or three-sixteenths of an inch in diameter. It will be seen therefore that if a metallic screen were used which is stationary and which has no means for dislodging the particles from its meshes, the screen would be likely to clog up under these conditions and as a matter of fact I have found in practice that it does, no matter whether it is fine or coarse. My device has distinctive advantages over these, in that the sulfur particles will not stick to the cloth, and will not find any openings bounded by solid wires into which they can become wedged. Furthermore the bag will be loose enough so that it will vibrate slightly with the variations in the current of water, and consequently tend to dislodge any particles that do have a tendency to stick to it.

I have found also that as stated above the methods of filtering the ordinary liquid solutions that are commonly used for spraying purposes are not sufficient. The filters themselves clog up and there is no way of releasing the particles from them. I find that this invention can be used for this purpose also to a great advantage over the ordinary stationary fixed metallic wire screen filters. For this purpose I have shown in Fig. 3 a modified construction in which the coarse wire screen 18 is used as in Fig. 1 for a support, but the soluble material is not shown. This is provided with a textile covering 21 in the form of a bag as before, but the open end of this bag is securely fastened around the end of a nipple 23, the other end of which is made fast to an inner screw-threaded flange 25 at the inlet end 12 of the containing receptacle 10, which in this case is shown as in substantially the same form as in Fig. 1. However, the ribs 16 at one end do not have to be used because it is centered about the nipple 23.

In this case the wire screen 18 serves to distend the bag and prevent its collapsing under any conditions whatever. The connection of the bag with the nipple 23 causes all the liquid to enter the bag, and consequently all of it to be filtered, and the bag is kept away from the walls of the container by the ribs and by being centered on the nipple 23. Although I have shown a filter 13 bag and wire screen of the same size in this figure as in Fig. 1, yet it is to be understood that that is not essential and that when the invention in this form is placed in an ordinary rubber hose either of the normal size employed in the art or of a larger size, the shape and size of the bag will be altered accordingly.

This form of the invention is important because sulfids are very unstable and easily break down. In certain compositions calcium carbonate and free sulfur are produced, both of which are practically insoluble in water at ordinary temperatures and tend to clog any ordinary spray nozzle or wire filter. In this case the textile filter is not clogged by these particles, partly because two pieces of comparatively rigid wire are not provided near to each other between which the particles can be crowded, and partly because the filter is capable of motion and consequently any dust or particles that enter its meshes are likely to be dislodged. Furthermore the filter is of a comparatively long dimension in the direction of the current. Therefore, even if the end of it does become clogged up the liquid can filter through its sides and its filtering power is not lost in this manner. Therefore this filter can be used until it is worn out generally without emptying it. These statements apply to the arrangement shown in Figs. 1 and 2 also. As soon as the solid cake is dissolved at its circumference, the bag is free to move slightly to dislodge any particles from it and its side walls are available for filtering purposes. In fact when the solid cake is all dissolved it can be used as a filter by connecting it in any way so that the liquid is not allowed to pass around it instead of through it.

It will be understood that although I have described the use of this invention with particular reference to a lime sulfur cake or cartridge, it is not limited thereto, for I have used it to advantage in connection with a cartridge formed mainly of sodium nitrate and other mixtures for insecticides, fungicides and fertilizers. Further although I have illustrated and described only two embodiments of the invention I am aware of the fact that other modifications can be made therein by any person skilled in the art without departing from the scope of the invention as expressed in the claims.

Therefore, I do not wish to be limited to all the details of construction or to the particular compositions mentioned herein, but what I claim is:—

1. In a device for use for spraying purposes, the combination with a casing having an inlet at one end and an outlet at the other, of a cake of solid soluble material centered within said casing and spaced from the outer walls thereof, and a woven textile filter bag inclosing and covering the end of said cake which is located adjacent to said outlet and also inclosing said inlet to prevent any water passing through the casing without also passing through the filter bag.

2. In a device for use for spraying purposes, the combination of a casing having an outlet at the end, a cake of soluble material located therein and spaced from said outlet end, the end of said cake toward the outlet being concave and a woven textile filter bag surrounding the end of said cake toward the outlet end and stretched across the concave end of the cake to provide a space for receiving solid particles and to prevent the filter bag entering said outlet.

3. In a device for spraying purposes, the combination of a reticulated member of a long hollow form for holding a soluble substance in solid form, a woven filter bag inclosing said member and the soluble substance, and means for directing a stream of water through one end of said reticulated member into contact with the soluble substance and out at the other end, whereby the water will be filtered by said bag.

4. In a device for spraying purposes, the combination of a casing having an inlet and an outlet located at opposite ends, a filter bag located between said inlet and outlet and having one end thereof substantially flat and located remote from said inlet, whereby the liquid passing through the bag will be filtered through the said end of the bag.

5. As an article of manufacture, a holder for a soluble solid cake for spraying purposes comprising a wire screen member for containing the cake therein, means for holding said member adjacent to a hose or pipe connection to cause water to flow through the interior of said screen member, and a textile filter in bag form entirely surrounding said screen member and having only one opening and that constituting a mouth secured around said hose or pipe connection for the purpose of directing all the water passing through the device into and through the filter.

6. As an article of manufacture, a device of the character described comprising a holder for a solid soluble cake for spraying purposes in the form of a wire screen member, a water conducting connection located adjacent to said wire screen member, and a textile filter in the form of a bag surrounding said screen member and covering both ends with the exception of the portion at said water conducting connection, said bag having an opening constituting a mouth secured around said connection, whereby all the water passing through the device must pass into the interior of the bag and through it.

7. In a device for spraying purposes, the combination of a casing having an inlet provided with a nipple extending into the casing for conducting water into its interior, a woven filter bag having an open mouth secured around said nipple to direct all the water entering the casing into said filter bag, and a wire screen member of substantially the same shape as said filter bag located within it and supported in fixed position in the casing for holding a solid cake of soluble material.

In testimony whereof I have hereunto set my hand.

FREDERIC D. HOUGHTON.